United States Patent [19]

Estabrook

[11] 4,062,780
[45] Dec. 13, 1977

[54] VACUUM FILTER WITH INDEXABLE FILTER WEB

[75] Inventor: Mark R. Estabrook, Rockford, Ill.

[73] Assignee: Barnes Drill Co., Rockford, Ill.

[21] Appl. No.: 670,401

[22] Filed: Mar. 25, 1976

[51] Int. Cl.² .................................... B01D 33/04
[52] U.S. Cl. ........................................ 210/401
[58] Field of Search ............... 210/400, 401, 406, 386; 209/307; 162/348, 349

[56] References Cited

U.S. PATENT DOCUMENTS

| 3,276,595 | 10/1966 | Houpillart | 210/401 |
| 3,305,094 | 2/1967 | Casson | 210/108 |
| 3,876,547 | 4/1975 | Kaess | 210/401 X |

Primary Examiner—William A. Cuchlinski, Jr.
Attorney, Agent, or Firm—Leydig, Voit, Osann, Mayer & Holt, Ltd.

[57] ABSTRACT

An indexable filter web is advanced beneath a vacuum box by a perforated flexible belt and is held against the belt by two endless bands adapted to travel along opposite sides of the vacuum box when the web is advanced.

2 Claims, 6 Drawing Figures

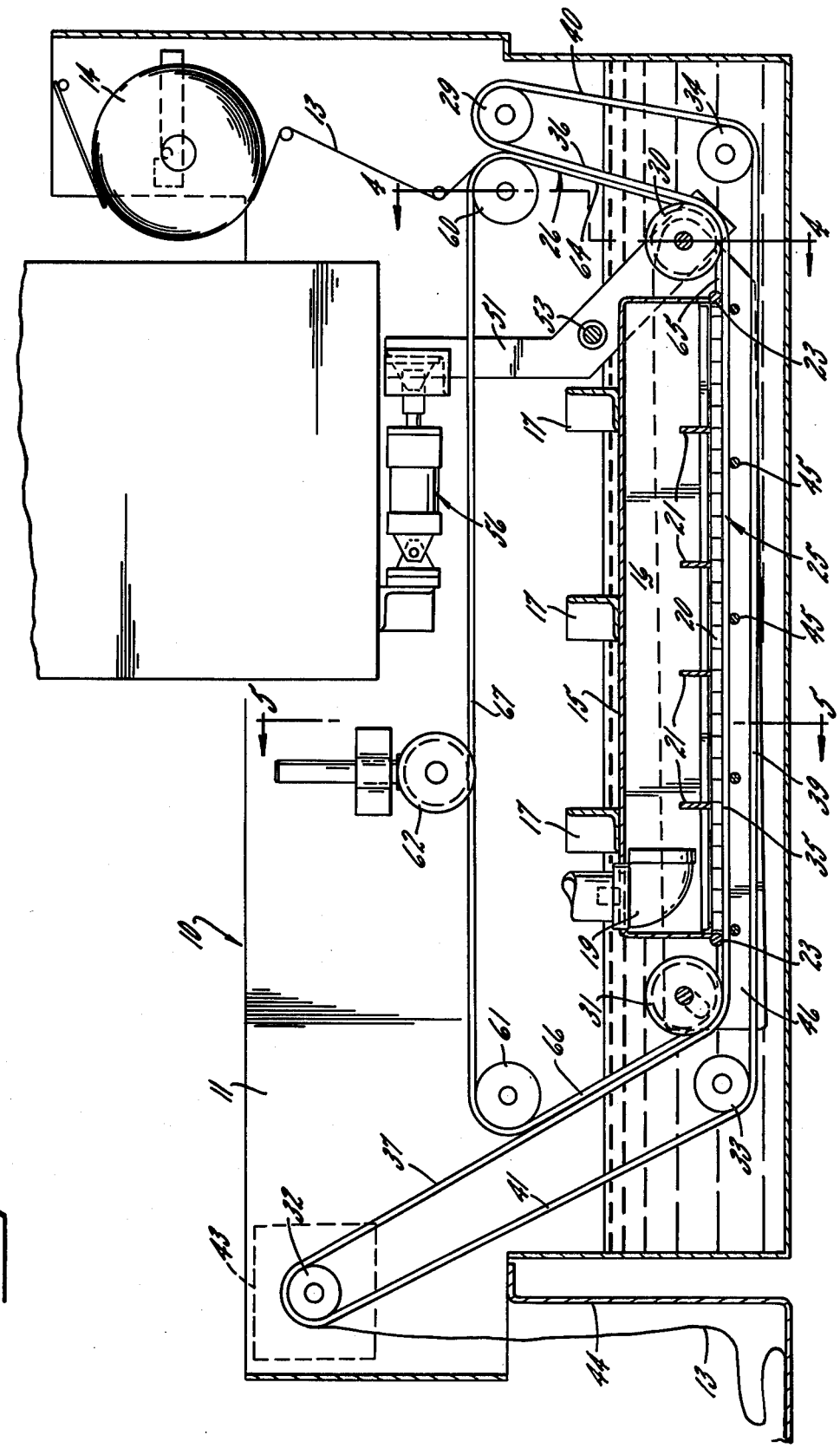

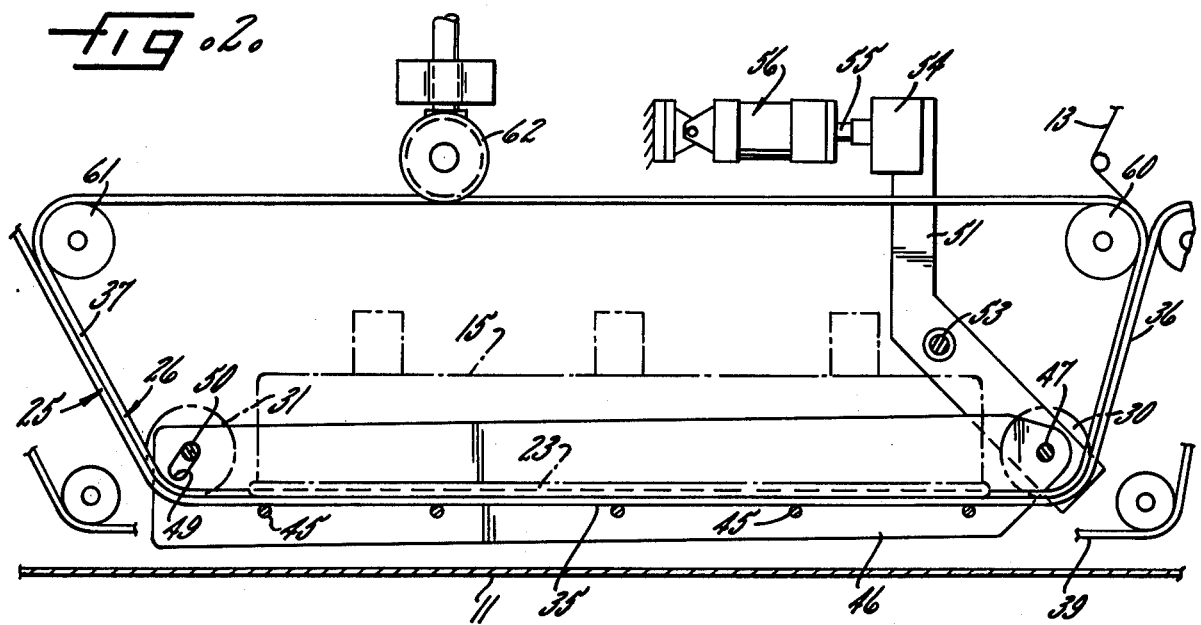
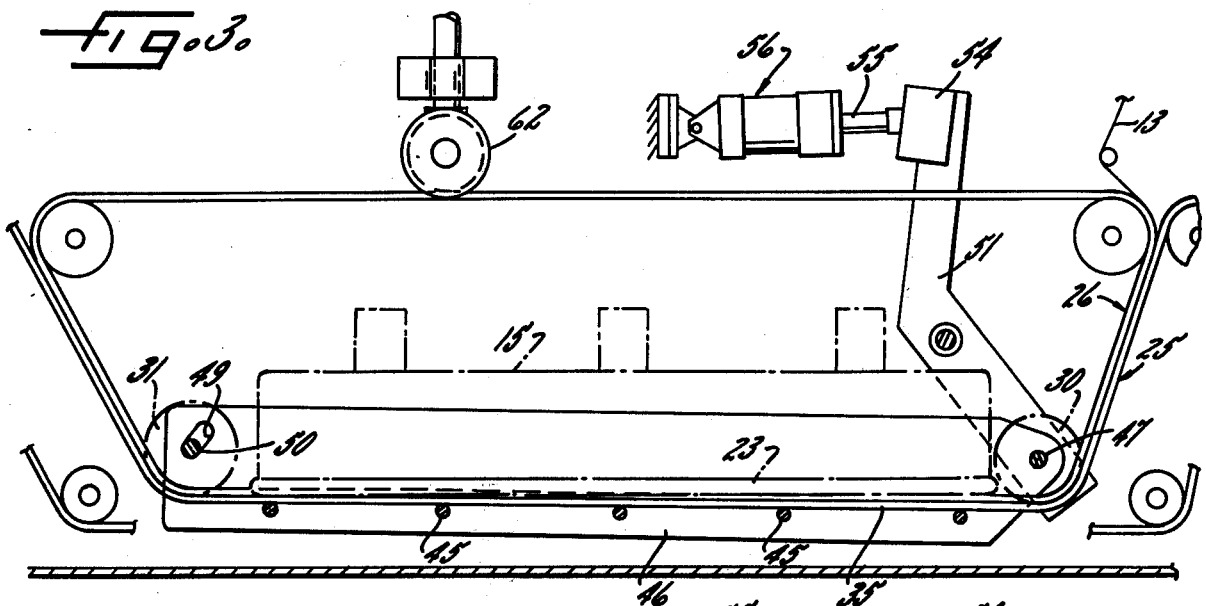
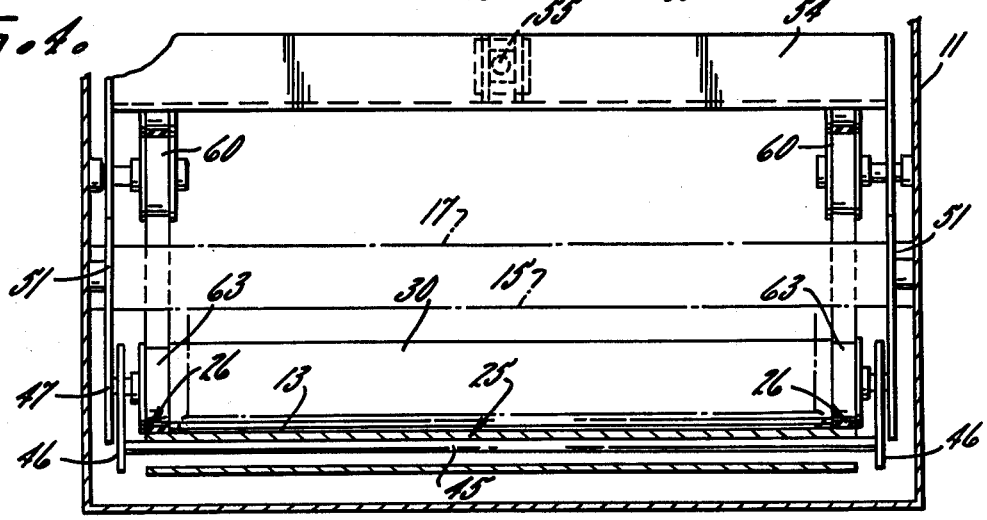

VACUUM FILTER WITH INDEXABLE FILTER WEB

BACKGROUND OF THE INVENTION

This invention relates to a liquid filter of the type in which an active portion of an elongated indexable filter web extends downwardly into a body of dirty liquid in a tank and across an opening in the submerged underside of a hollow box defining a vacuum chamber. Filtering of the liquid takes place as the liquid is sucked through the web and into the vacuum chamber. When the pores of the active portion of the filter web become so clogged as to substantially impair the flow rate, the filtering action is interrupted and the web is advanced endwise to bring a fresh length thereof into the filtering position.

A typical filter of the foregoing type is disclosed in Casson U.S. Pat. No. 3,305,094 in which the filter web is stretched between a supply roll and a pair of take-up rolls and is indexed by rotating one of the take-up rolls. In another type of filter, the filter web is backed by a flexible conveyor which is adapted to be advanced to effect indexing of the web. In these filters, difficulty is encountered in initially threading a new web into position beneath the vacuum box and in maintaining good control over the web during indexing.

SUMMARY OF THE INVENTION

The primary aim of the present invention is to provide a vacuum filter having unique and extremely simple means for holding the filter web against and for movement with a flexible conveyor for backing and indexing the web, such means coacting with the conveyor to enable quick and easy initial threading of the web and to reduce the danger of the web being torn during indexing.

A more detailed object is to provide a vacuum filter in which the filter web is backed and supported by a flexible perforate belt and is held against the belt by a pair of endless bands located on opposite sides of the vacuum box. The belt and the bands coact to enable automatic threading of a new filter web and, when the belt is advanced to index the web, the bands are automatically driven to avoid tearing of the web.

The invention also resides in the unique arrangement of the conveyor belt and the endless hold-down bands within the tank and around the vacuum box.

These and other objects and advantages of the invention will become more apparent from the following detailed description when taken in conjunction with the accompanying drawings.

BRIEF DESCRIPTION OF THE DRAWINGS

FIG. 1 is a fragmentary longitudinal cross-sectional view of an improved vacuum filter embodying the novel features of the present invention.

FIG. 2 is a view of parts illustrated in FIG. 1 and showing the vacuum box in phantom for purposes of clarity.

FIG. 3 is a view similar to FIG. 2 but showing certain parts in moved positions.

FIGS. 4 and 5 are fragmentary cross-sections taken substantially along the lines 4—4 and 5—5, respectively, of FIG. 1.

DETAILED DESCRIPTION OF THE PREFERRED EMBODIMENT

Figure 5:
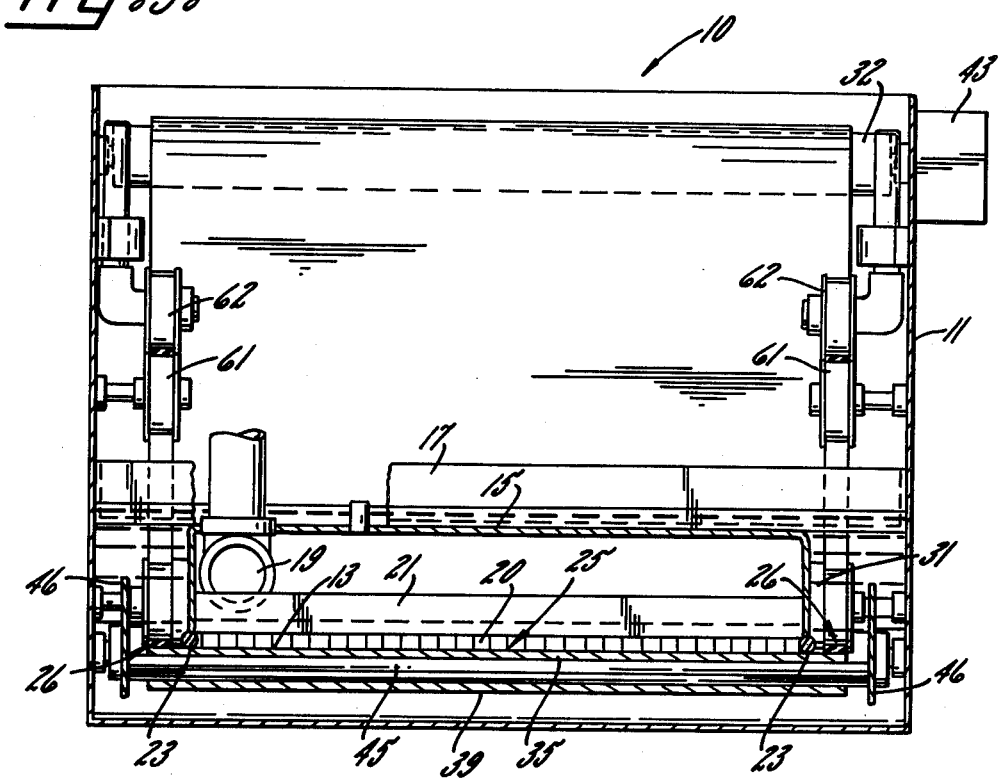

As shown in the drawings for purposes of illustration, the invention is embodied in a so-called blow-back filter 10 comprising an open box-like tank 11 adapted to hold a body of liquid to be filtered through an elongated strip or web 13 of porous filter media composed of suitable paper or fabric. The web is adapted to be drawn off of a rotatable supply roll 14 above the liquid and then is guided beneath a vacuum box 15 which is at least partially submerged in the liquid, the web covering the open lower side of the box. The chamber 16 defined by the interior of the box is subjected to a vacuum for inducing the straining of liquid through the web and into the chamber from which clean liquid is returned to the system for reuse.

Intermittently, the vacuum in the chamber 16 is dissipated and a positive pressure is produced therein to create a reverse flow of liquid through the active portion of the web 13 and thereby loosen and release the filtered out solids that collect as a cake on the underside of the web. After several vacuum cycles, however, the active portion of the web becomes so clogged by solid particles trapped in the pores of the web so as to materially reduce and impair the flow rate through the web even immediately after the web has been cleaned by a blow-back cycle. When this condition occurs, the active portion of the web is replaced by advancing the web endwise to bring a fresh length thereof into the filtering position.

More specifically, the vacuum box 15 is generally rectangular in shape and thus is defined by a top wall, front and rear end walls and a pair of opposed side walls. The box is suspended in the tank 11 by bars 17 secured to the top wall and extending between the side walls of the tank. A pipe 19 extends into the chamber 16 through the top wall of the box and communicates with a reversible pump (not shown) adapted to either create a vacuum and suck liquid from the chamber or to pump filtrate back into the chamber and create a positive pressure for dissipating the vacuum and backwashing the web 13. Reference is made to the aforementioned Casson patent for a more detailed disclosure of the pump.

Figure 6:
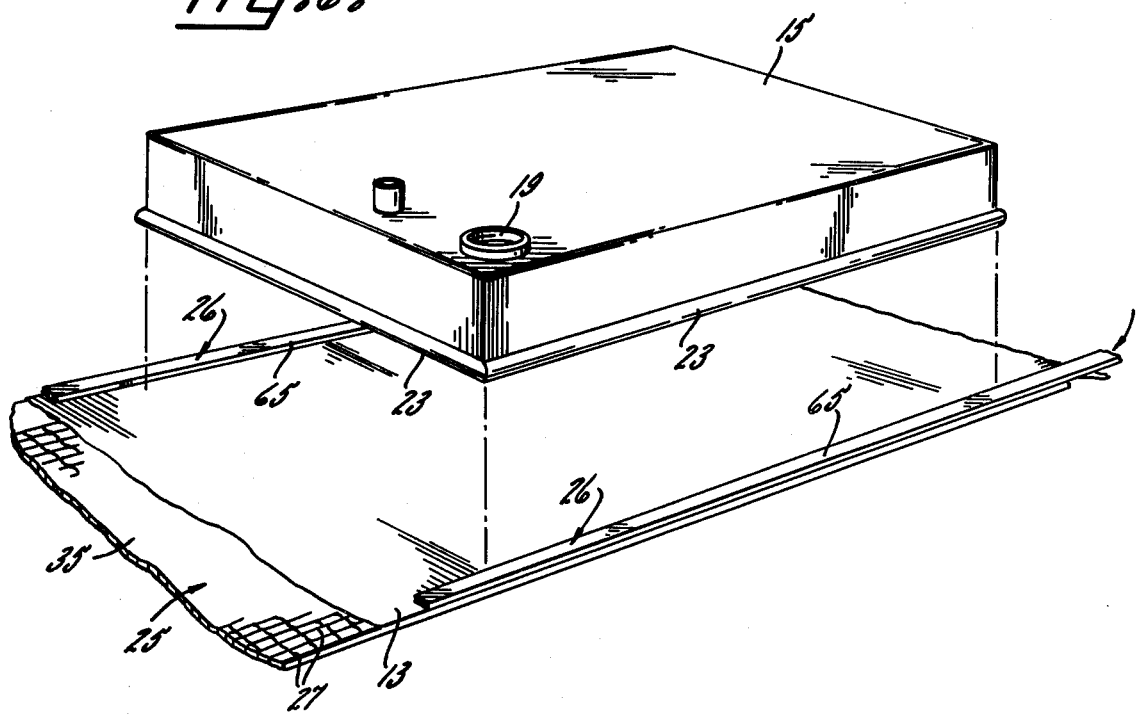
FIG. 6 is an exploded perspective view showing the vacuum box, the hold-down bands, the filter web and the conveyor belt.

The bottom of the vacuum box 15 is open in the sense that liquid can pass upwardly into the box. There is, however, provided a perforated wall 20 at the lower side of the box and directly above the filter web 13 in order to prevent the web from being sucked upwardly into the box. Herein, the wall 20 is formed by a section of a Cambridge belt which comprises a series of interconnected grids each defining an opening with dimensions of approximately ½ by ¼ inch. Struts 21 extend between the side walls of the box and overlie the wall 20 so as to keep the latter from bowing upwardly in the box. To establish a good seal between the box and the web, round rods 23 (FIG. 6) extend around the lower margins of the box and are positioned to engage the upper side of the web.

In accordance with the present invention, the web 13 is supported beneath the vacuum box 15 by a flexible perforated conveyor 25 which also is used to index the web. Flexible bands 26 (see FIG. 6) are disposed on opposite sides of the box and press the side margins of the web downwardly against the conveyor, the bands being advanced with the web when the latter is indexed by the conveyor. This arrangement insures good control over the web, reduces tearing of the web during indexing and allows a new web to be easily threaded into place for subsequent advancement beneath the box.

More particularly, the conveyor 25 comprises an endless Cambridge belt which is formed by longitudinally and transversely extending rows of pivotally interconnected grids 27 (FIG. 6) defining openings having dimensions of approximately 1 by ½ inch. As shown in FIG. 1, the belt 25 is trained around rollers 29, 30, 31, 32, 33 and 34 and comprises an active run with a horizontal portion 35 disposed beneath the box 15 and with two upright portions 36 and 37 located at opposite ends of the horizontal portion. The return run of the belt comprises a horizontal portion 39 and two upright portions 40 and 41 which are disposed below and extend generally parallel to the horizontal portion 35 and the upright portions 36 and 37, respectively, of the active run. When the roller 32 is rotated counterclockwise by a suitable drive mechanism 43, the upper active run of the belt is advanced from the right to left as viewed in FIG. 1. As a result, an additional length of web 13 is drawn downwardly off of the supply roll 14, a fresh portion of web is advanced horizontally beneath the box 15, and the previously clogged portion of web is advanced upwardly out of the tank 11 and is dumped in a disposal container 44.

The portion of the active run of the belt 25 that is disposed immediately beneath the vacuum box 15 is supported on its lower side and is prevented from sagging by a series of transversely extending bars 45 (FIG. 2) located beneath the belt. At their ends, the bars 45 are connected to plates 46 disposed on opposite sides of the vacuum box. One end of each plate is pivotally received on the axle 47 of the roller 30 while the other end of the plate is formed with an elongated slot 49 which receives the axle 50 of the roller 31. The axle 47 is supported at its ends on the lower ends of transversely spaced levers 51 which are pivotally connected to the sides of the tank 11 as indicated at 53. A bar 54 spans the upper ends of the levers and is connected to the rod 55 of a fluid-operator actuator 56 which is suitably supported within the tank 11.

When the rod 55 is retracted as shown in FIGS. 1 and 2, the roller 30 and the side plates 46 are positioned such that the bars 45 press the horizontal portion 35 of the belt 25 upwardly and cause the web 13 to seal against the rods 23 on the lower side of the vacuum box 15. By advancing the rod as shown in FIG. 3, the plates 46 are pivoted so as to cause the bars 45 to move downwardly and to release the sealing pressure between the web and the rods 23. The web then can be indexed without being torn by the rods.

Each hold-down band 26 is made of rubber or other suitable flexible material and each is trained around pulleys 60, 61 and 62 (FIG. 1). In addition, each hold-down band extends beneath the rollers 30 and 31 and is guided within grooves 63 (FIG. 4) formed in the end portions of the rollers. Each band includes an active run having a first upright portion 64 (FIG. 1), a horizontal portion 65 and a second upright portion 66 respectively paralleling the portions 36, 35 and 37 of the active run of the belt 25. The return run 67 of each belt is located above the vacuum box 15 and extends horizontally between the pulleys 61 and 60.

The web 13 and the conveyor belt 25 are somewhat wider than the vacuum box 15 and thus the web extends laterally beyond the rods 23 at the bottom of the box and is backed across its full width by the belt. The bands 26, however, are spaced apart a distance less than the width of the web and run directly adjacent opposite sides of the box. Accordingly, the bands 26 press the side margins of the web against the side margins of the belt 25 and cause the web to advance with the belt when the latter is indexed.

From the foregoing, it will be seen that the bands 26 coact with the belt 25 to provide positive control of the web 13. When a new supply roll 14 is required, it is necessary only to thread the free end of the web a short distance between the upright portion 36 of the belt and the upright portions 64 of the bands and then index the belt to advance the web into its filtering position beneath the vacuum box 15. Each time the belt is indexed, the active runs of the bands are driven in the same direction as the active run of the belt by virtue of the frictional contact between the web and the bands and thus there is no danger of the web being torn during indexing.

I claim:

1. A vacuum filter comprising a tank adapted to be filled to an approximate level with liquid to be filtered, a rectangular box having top, side and end walls defining a vacuum chamber and having a perforate bottom wall disposed within said liquid, a supply roll of disposable filter web located above said liquid, a flexible and perforated endless conveyor wider than said chamber and located to guide said web downwardly into said liquid, beneath the underside of said bottom wall to cover the latter, and then upwardly out of the liquid, said conveyor having an upper active run comprising a horizontal portion located between first and second upright portions and further having a lower return run with portions located below and generally parallel to the portions of said active run, means for creating a vacuum in said box thereby to suck said liquid through said conveyor, said web and said bottom wall and into said box, mechanism for periodically driving said conveyor to advance a clean length of web beneath said bottom wall, a pair of flexible endless bands extending along opposite side walls of said box and positioned above the active run of said conveyor in engagement with said web to hold the side margins of the web against the upper surface of said conveyor, each of said bands having an active run comprising a horizontal portion located between first and second upright portions, the portions of the active run of each band being located adjacent to and parallel with the respective portions of the active run of said conveyor, each of said bands further comprising a return run located above the active run of the band, and means rotatably supporting and guiding said bands to enable the latter to advance with said web, the first upright portion of each band coacting with the first upright portion of said conveyor to enable initial threading of said web from said supply roll and between said bands and said conveyor.

2. A vacuum filter as defined in claim 1 in which said conveyor is formed by longitudinally and transversely extending rows of pivotally interconnected grids.

* * * * *